April 27, 1926.
L. M. STELLMANN ET AL
1,582,314
AIR COOLED INTERNAL COMBUSTION ENGINE
Filed Dec. 26, 1919  5 Sheets-Sheet 1
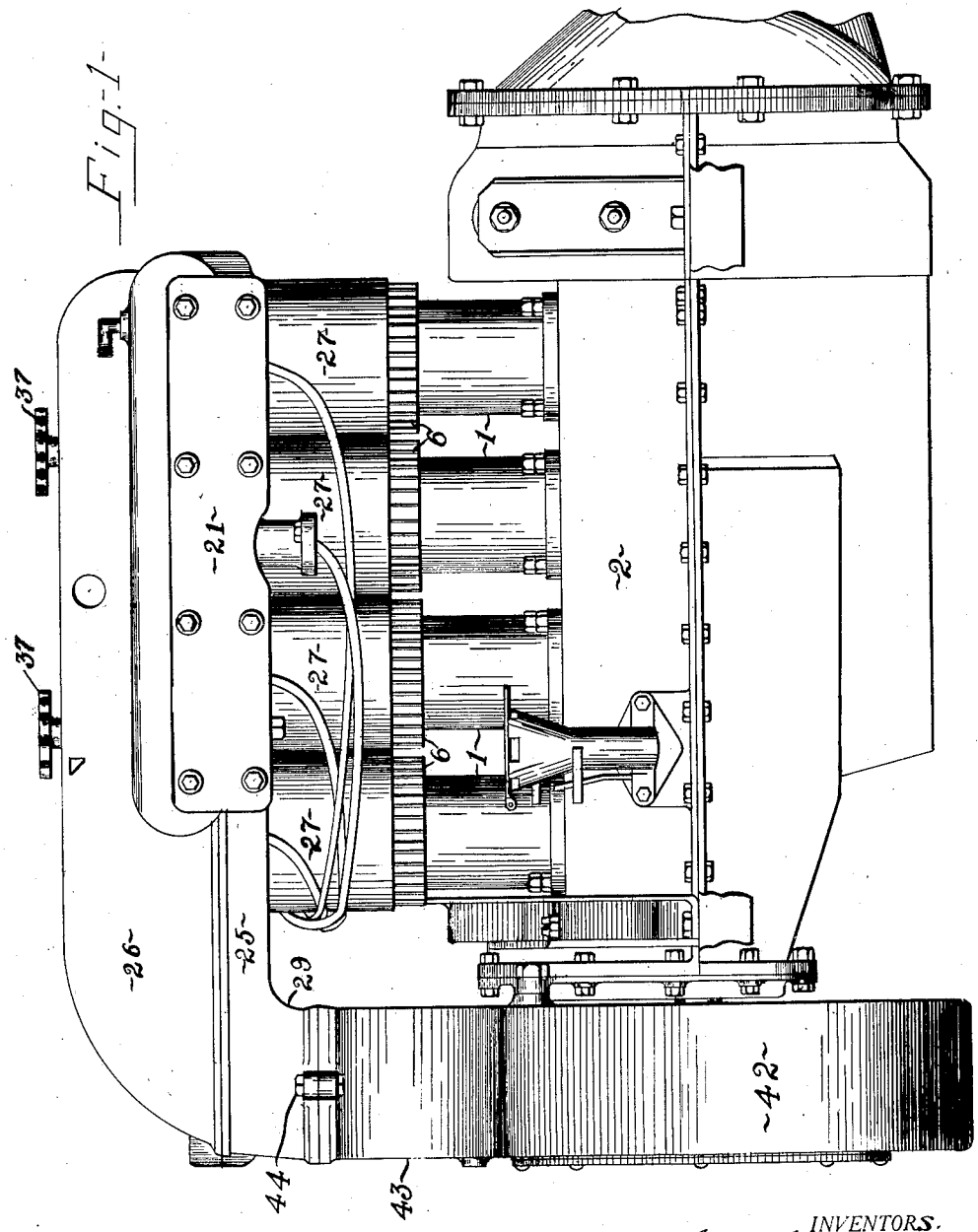
INVENTORS.
Louis M. Stellmann
and Ralph Murphy
BY
Parsons & Bodell
ATTORNEYS.

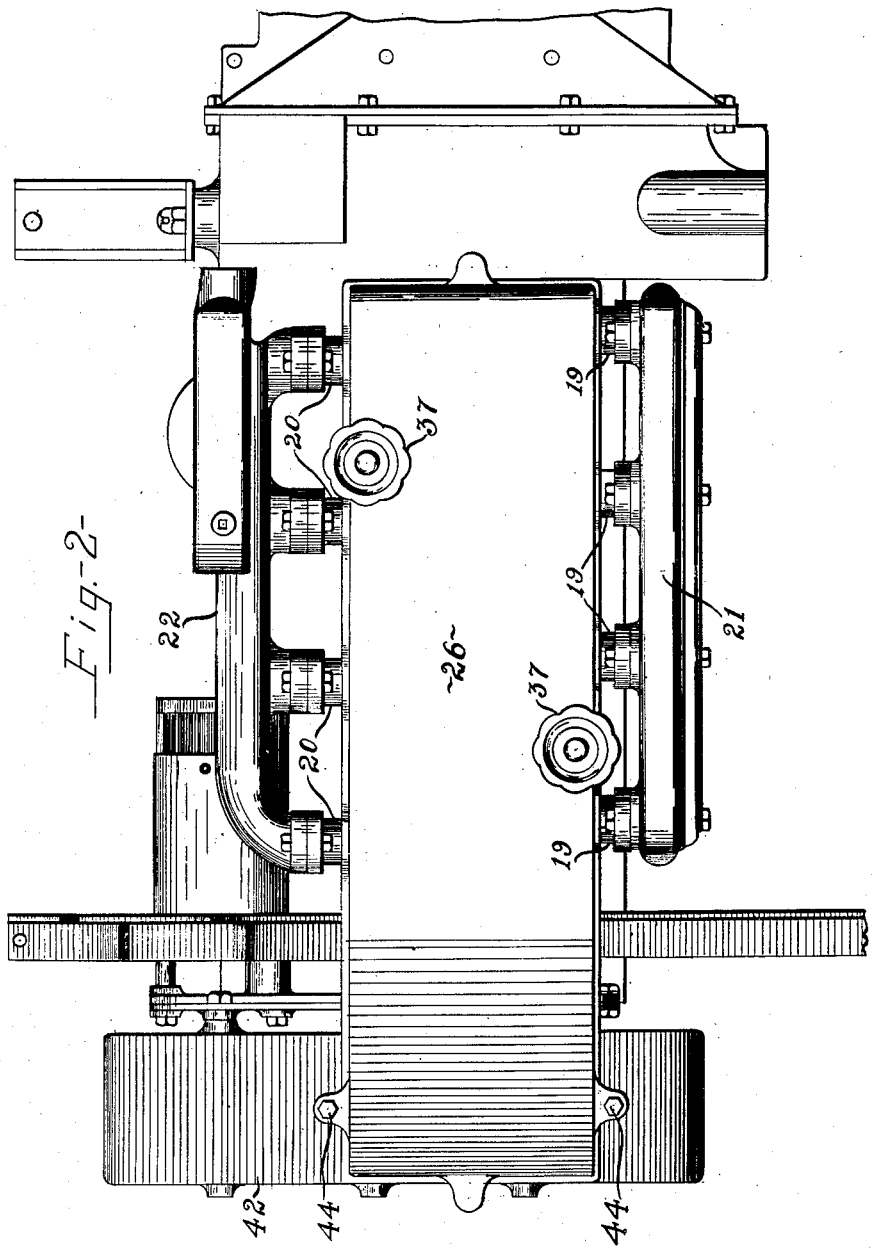

April 27, 1926.
L. M. STELLMANN ET AL
AIR COOLED INTERNAL COMBUSTION ENGINE
Filed Dec. 26, 1919    5 Sheets-Sheet 3
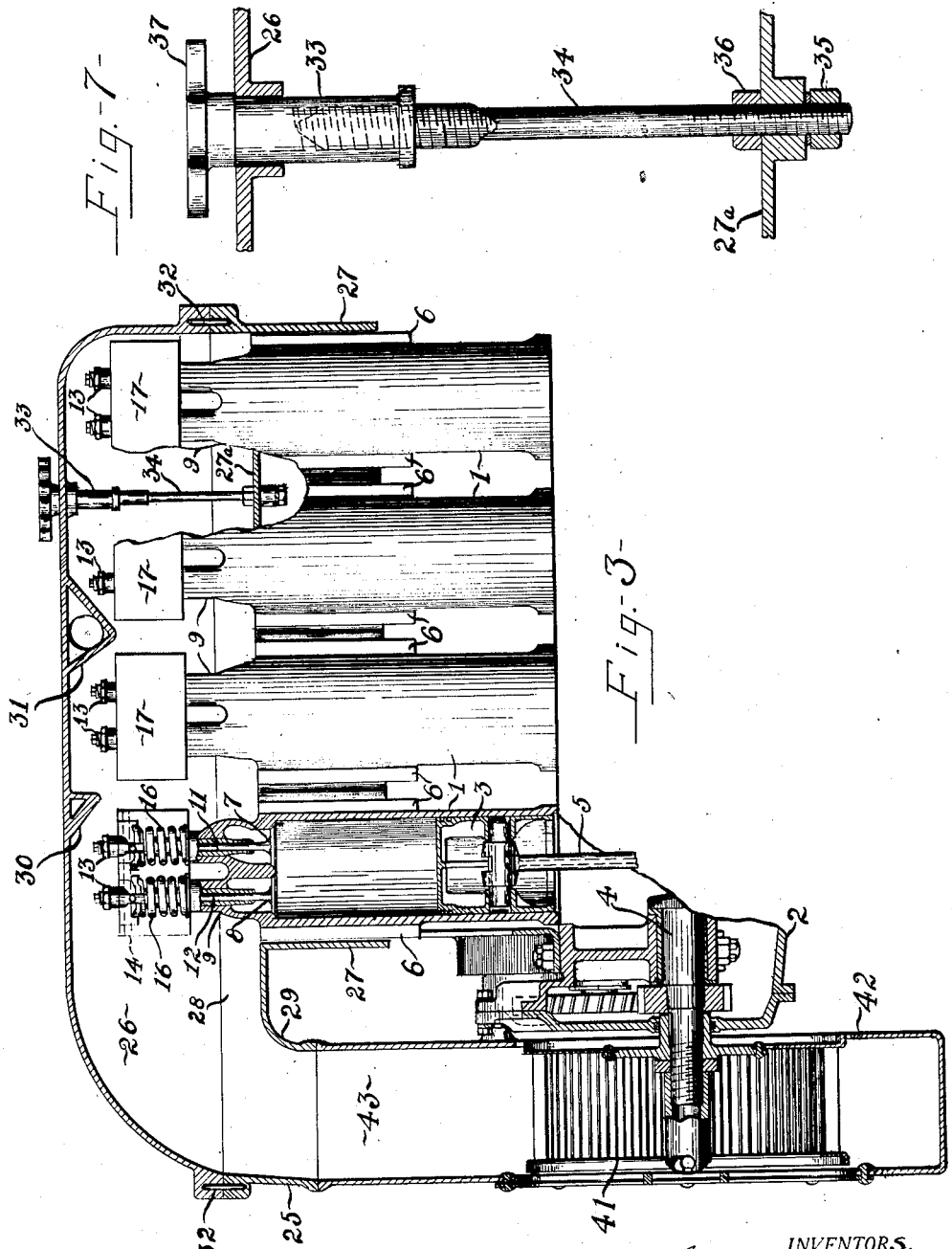

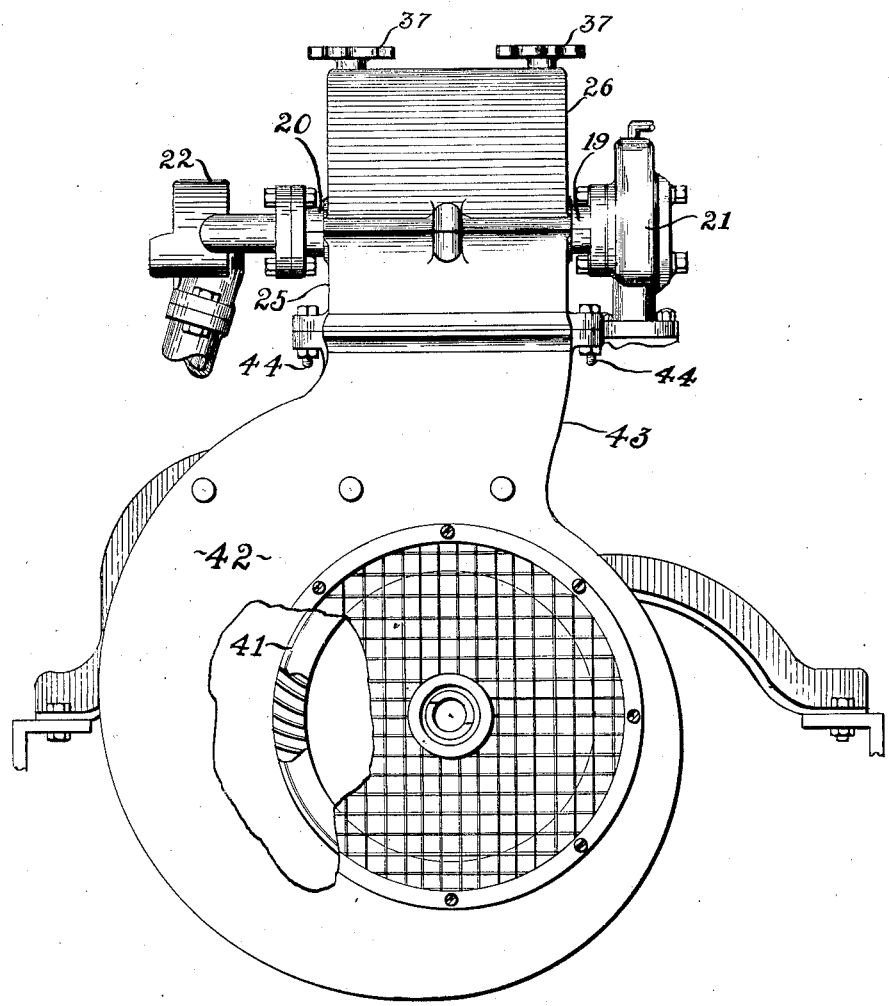

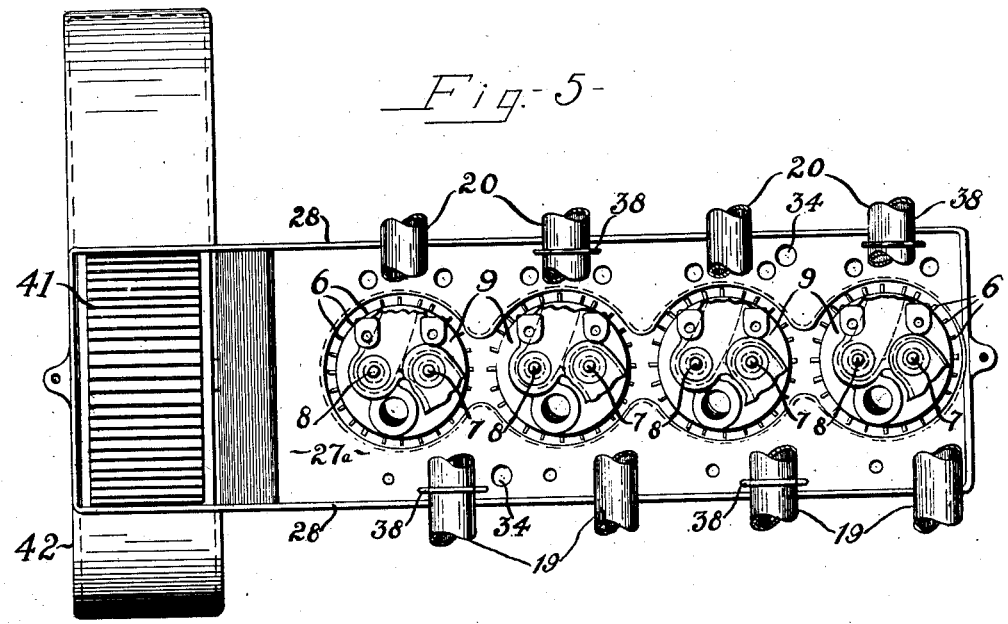
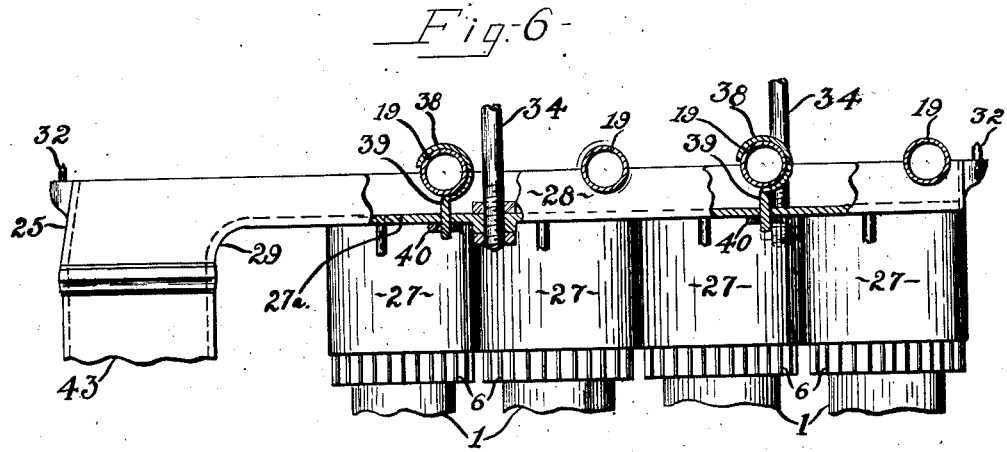

Patented Apr. 27, 1926.

1,582,314

UNITED STATES PATENT OFFICE.

LOUIS M. STELLMANN AND RALPH MURPHY, OF SYRACUSE, NEW YORK, ASSIGNORS TO H. H. FRANKLIN MFG. COMPANY, OF SYRACUSE, NEW YORK, A CORPORATION OF NEW YORK.

AIR-COOLED INTERNAL-COMBUSTION ENGINE.

Application filed December 26, 1919. Serial No. 347,470.

*To all whom it may concern:*

Be it known that we, LOUIS M. STELLMANN and RALPH MURPHY, citizens of the United States, and residents of Syracuse, in the county of Onondaga and State of New York, have invented a certain new and useful Air-Cooled Internal-Combustion Engine, of which the following is a specification.

This invention relates to air cooled internal combustion engines and has for its object a particularly simple and efficient means for directing the current of air to the cylinders, which means is particularly simple and compact in construction, readily assembled on the engine and easily removed in whole or in part for permitting access to the engine.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly broken away of an internal combustion engine embodying our invention.

Figure 2 is a plan view of parts seen in Fig. 1.

Figure 3 is a longitudinal sectional view thereof, partly in elevation.

Figure 4 is a front elevation of parts seen in Fig. 1.

Figure 5 is a plan view, parts being removed, and parts being broken away, the upper section of the air conduit being removed.

Figure 6 is an elevation, parts being omitted, of parts seen in Fig. 5.

Figure 7 is an enlarged detail view of the means for securing the upper section of the case to the lower.

This air cooled engine comprises generally a plurality of cylinders, a centrifugal fan connected to and preferably mounted on the front end of the crank shaft of the engine, a fan casing having an upwardly extending outlet, and a spiral circumferential wall extending from near the periphery of the fan at one side of the outlet and diverging away from the periphery of the fan to the opposite side of the outlet, passages around the cylinders and individual thereto, an air conduit extending over the heads of the cylinders, and being common to all of said passages, said passages at their upper ends being of greater diameter than the cylinders and opening directly into the conduit through the bottom thereof, the conduit being of as great width as the diameters of the passages and communicating at its front end with the outlet of the fan and the bottom of the casing being substantially flat and substantially flush with the heads of the cylinders. The valves are in the heads of the cylinders and the stems thereof extend into the air conduit.

1 designates the cylinders which are here shown as four in number.

2 is the crank casing on which the cylinders are mounted, one behind the other.

3 are the pistons movable in the cylinders and connected to the crank shaft 4 by connecting rods 5.

The cylinders are preferably provided with longitudinal heat radiating flanges 6 and are spaced apart on the crank casing 2.

In the illustrated form of my invention, the cylinders are provided with intake and exhaust valves 7 and 8 in the heads 9 thereof, the valves having stems 11 and 12 extending above the head and operated by suitable valve mechanism including rocker arms 13 pivoted at 14 and being connected to lifter rods which extend vertically along the cylinders and have their lower ends coacting with cams on the cam shaft within the crank casing 2.

The valve stems 11 and 12 are operated by the rocker arms against the action of suitable springs 16.

These valve operating parts, including rock arms and springs, are enclosed within suitable casings 17 individual to the valves of each cylinder.

The passages controlled by the valves communicate with laterally extending intake and exhaust ports 19 and 20 to which the intake and exhaust manifolds 21, 22 are connected respectively.

Preferably, these ports 19, 20 are cast integral with heads of the cylinders.

The casing enclosing the cylinders as here shown includes lower and upper sections 25, 26, the lower section having means enclosing the cylinders 1 as shells 27. These shells extend far enough down the cylinders to enclose the expansion chambers of the cylinders or the radiating flanges thereon and hence terminate short of the top of the crank casing and the lower ends of the cylinders. The shells are open at their lower ends to permit the outlet of the air. Said shells depend from the lower wall or floor 27ª of the lower section 25 which floor is located about flush with the heads of the cylinders and is formed with openings conforming generally to the curvature of the cylinders.

The walls of these openings and of the shells are spaced apart where the cylinders are nearest together, that is, these shells and openings are part cylindrical and open into each other at their contiguous sides where the cylinders are nearest together as seen in Fig. 5.

The lower section 25 is also formed with longitudinally extending side flanges 28 and with a downturned nipple 29 at its front end for connection to the blower to be presently described. The upper section 26 is in the form of a box open at its lower side and rests upon the upper edge of the lower section 25, and is detachably secured to the lower section. The upper section together with the lower section forms a boxlike conduit common to all the cylinders, this air conduit enclosing the valve and valve operating parts.

The upper section 26 is also formed with means for distributing the air to the cylinders here shown as deflectors 30, 31 so arranged that the air is distributed proportionately to the cylinders. The upper section is connected to the lower section by interfitting means as dowel pins 32 at each end thereof and is detachably secured to the lower section by any suitable means operable from the outside of the casing, as a sleeve nut 33 extending through the top of the section 26 and threading on a post or stud 34 rising from the floor 27ª of the lower section 25.

As seen in Fig. 7, this stud is threaded at its lower end and extends through the floor 27ª and is held in position by nuts 35, 36 turning against the upper and lower sides of the floor 27ª. The sleeve nut 33 is provided with a suitable handle as a wheel 37 at its outer end. As here shown there are two such sleeve nuts 33 and contiguous parts.

The casing is supported by the cylinders and as here shown, the lower section 25 is supported from the ports 19, 20. As here shown, it is suspended from said ports by means of hangers 38 engaging some of said ports 19, 20 and having stems 39 extending through the floor 27ª and threading into nuts 40 which turn against the under side of the blower, see Fig. 6. The casing is preferably quadrangular in cross section as is also the outlet for the fan and the outlet for the fan and the casing are coextensive in cross sectional area.

41 designates the fan which to obtain the best results is mounted directly upon the crank shaft, the fan being of the sirocco type. 42 is the casing which is spiral and the outlet of the fan is located directly above the crank shaft in front of or in line with the front cylinder and the spiral circumferential wall of the fan casing extends from one side of the outlet near the periphery of the fan to the opposite side of the outlet 43. The outlet 45 is detachably secured to the depending nipple 29 of the air conduit in any suitable manner as by bolts 44 extending through external lugs provided at the meeting ends of the outlet 43 and the nipple 29.

In operation air is forced by the blower through the casing and out through the lower ends of the shells. The air finds an outlet from the lower ends of the shells and passed out under the dash board of the vehicle to which the engine is applied.

Owing to the relative arrangement of the fan on the crank shaft and the spiral casing, the fan delivers a maximum amount of air with minimum power, and the air is conducted from the fan with minimum resistance. Owing to the relative arrangement of the outlet of the casing and of the air conduit or casing, the air is received by the conduit with minimum resistance, and owing to the relative arrangement of the conduit and the cylinders and the passages around the cylinders, the air is delivered to the jackets or shells with minimum resistance. Hence, owing to the entire arrangement of the elements and the relativity of features thereof, a maximum volume of air is moved with maximum speed and with minimum power and resistance and delivered about the cylinders.

Owing to the construction and arrangement of the casing it is readily applied to the engine and the upper section is readily removable for permitting access to parts as the valve operating mechanism within the casing and also the lower section is readily removable.

This casing when installed does not cover any working parts or accessories to the engine except parts of the valve mechanism, and when the hood is lifted, does not in any way interfere with or obstruct access to such parts or accessories, as the carburetor, etc.

What we claim is:

1. In an air cooled internal combustion engine, the combination of a plurality of cylinders, a centrifugal fan mounted on the front end of the crank shaft, a fan casing having a vertical outlet, and a spiral circumferential wall extending from near the periphery of the fan at one side of the outlet and diverging away from the periphery of the fan to the opposite side of the outlet, passages around the cylinders and individual thereto, an air conduit extending over the heads of the cylinders and being common to all of said passages, said passages at their tops being of greater diameter than the cylinders and opening directly through the bottom of the conduit and being open at their lower ends and the conduit being of as great width as the diameters of the passages and communicating at its front end with the outlet of the fan, and being of the same extent in cross section as the outlet of the fan, substantially as and for the purpose described.

2. In an air cooled internal combustion engine, the combination of a plurality of cylinders, a centrifugal fan mounted on the front end of the crank shaft, a fan casing having a vertical outlet, and a spiral circumferential wall extending from near the periphery of the fan at one side of the outlet and diverging away from the periphery of the fan to the opposite side of the outlet, passages around the cylinders and individual thereto, an air conduit extending over the heads of the cylinders and being common to all of said passages, said passages at their tops being of greater diameter than the cylinders and opening directly through the bottom of the conduit and being open at their lower ends and the conduit being of as great width as the diameters of the passages and communicating at its front end with the outlet of the fan and being of the same extent in cross section as the outlet of the fan, and the bottom of the conduit being substantially flat and substantially flush with the heads of the cylinders, substantially as and for the purpose specified.

3. In an air cooled internal combustion engine, the combination of a plurality of cylinders, a centrifugal fan mounted on the front end of the crank shaft, a fan casing having a vertical outlet, and a spiral circumferential wall extending from near the periphery of the fan at one side of the outlet and diverging away from the periphery of the fan to the opposite side of the outlet, passages around the cylinders and individual thereto, an air conduit extending over the heads of the cylinders and being common to all of said passages, said passages at their tops being of greater diameter than the cylinders and opening directly through the bottom of the conduit and being open at their lower ends and the conduit being of as great width as the diameters of the passages and communicating at its front end with the outlet of the fan, and being of the same extent in cross section as the outlet of the fan, the conduit and the outlet of the fan casing being quadrangular in cross section and the bottom of the conduit being substantially flush with the heads of the cylinders, substantially as and for the purpose set forth.

4. In an air cooled internal combustion engine, the combination of a plurality of cylinders, a centrifugal fan mounted on the front end of the crank shaft, a spiral casing for the fan having a vertical outlet above the axis of the fan and directly in line with the cylinders and an air conduit extending over the heads of the cylinders and being common to all of the cylinders, passages around the cylinders respectively and opening directly through the bottom of the conduit and being open at their lower ends, the conduit being of as great width as the diameters of said passages and communicating at its front end with the outlet of the fan, the conduit being of the same extent in cross section as the outlet of the fan, and the bottom thereof being substantially flush with the heads of the cylinders, substantially as and for the purpose described.

5. In an air cooled internal combustion engine, the combination of a plurality of cylinders having valves in the heads thereof, a centrifugal fan mounted on the front end of the crank shaft, a spiral casing for the fan having a vertical outlet above the axis of the fan and directly in line with the cylinders and an air conduit extending over the heads of the cylinders and being common to all of the cylinders, passages around the cylinders respectively and opening directly through the bottom of the conduit, and being open at their lower ends, the conduit being of as great width as the diameters of said passages and communicating at its front end with the outlet of the fan, the conduit being of the same extent in cross section as the outlet of the fan, and the bottom thereof being substantially flush with the heads of the cylinders, the valves in the cylinder heads extending into the air conduit, substantially as and for the purpose specified.

6. In an air cooled internal combustion engine, the combination of a plurality of cylinders, a casing for the cylinders comprising shells enclosing the cylinders and individual thereto and the air conduit enclosing the heads of the cylinders and being common to all of said shells and opening directly thereinto and being of as great width as the diameters of the shells, a fan mounted on the crank shaft, and a spiral casing for the fan and having a vertically extending outlet, the spiral wall of the casing diverging from near the periphery of the fan at one side of the outlet to the opposite side of the outlet and the casing at the outlet being of as great extent in cross section as the air conduit.

7. In an internal combustion engine, the combination of a plurality of cylinders, and means for directing the air against the cylinders comprising shells encircling the cylinders, an air conduit enclosing the heads of the cylinders and being common to all of the shells, the air conduit including a lower section at the upper ends of the shells and being of as great width as the diameter of the shells, and an upper section mounted on the lower section, and means for forcing air through the conduit and the shells, substantially as and for the purpose specified.

8. In an air cooled internal combustion engine, the combination of a plurality of cylinders, a casing for the cylinders comprising shells individual to the cylinders, a conduit enclosing the heads of the cylinders and communicating with the upper ends of the shells, the conduit being divided longitudinally into upper and lower sections whereby the upper section is removable and means for holding the sections together, substantially as and for the purpose set forth.

9. In an air cooled internal combustion engine, the combination of a plurality of cylinders, a casing for the cylinders comprising shells individual to the cylinders, a conduit enclosing the heads of the cylinders and communicating with the upper ends of the shells, the conduit being divided longitudinally into upper and lower sections whereby the upper portion is removable, the cylinders having lateral inlet and exhaust ports and the conduit being formed with openings for such ports in the meeting edges of the sections thereof, substantially as and for the purpose described.

10. In an air cooled internal combustion engine, the combination of a plurality of cylinders, a centrifugal fan mounted on the front end of the engine and connected to the crank shaft to be actuated thereby, a casing for the fan having an outlet above the fan and an air conduit extending over the heads of the cylinders and being common to all of the cylinders, passages around the cylinders respectively and opening directly through the bottom of the conduit, the passages being open at their lower ends, the conduit being of as great width as the diameters of said passages and communicating at its front end with the outlet of the fan and the bottom of the conduit being at nearly the same level as the cylinder heads.

11. In an air cooled internal combustion engine, the combination of a plurality of cylinders, a centrifugal fan mounted on the front end of the engine and connected to the crank shaft to be actuated thereby, a casing for the fan having an outlet above the fan and an air conduit extending over the heads of the cylinders and being common to all of the cylinders, passages around the cylinders respectively and opening directly through to the bottom of the conduit, the passages being open at their lower ends, the conduit being of as great width as the diameters of said passages and communicating at its front end with the outlet of the fan and the bottom of the conduit being at nearly the same level as the cylinder heads, the cylinders having valves in the heads thereof and said valves extending into the air conduit.

12. In an air cooled internal combustion engine, the combination of a plurality of cylinders, a casing for the cylinders comprising shells individual to the cylinders, a conduit enclosing the heads of the cylinders and communicating with the upper ends of the shells, the conduit being divided longitudinally into upper and lower sections whereby an upper portion is removable, the cylinders having lateral inlet and exhaust ports and the casing being formed with openings for such ports in the meeting edges of the sections thereof, the lower section of the casing having means for securement to the ports, substantially as and for the purpose specified.

13. In an air cooled internal combustion engine, the combination of a plurality of cylinders having laterally extending inlet and exhaust ports, a casing enclosing the cylinders and supported on said ports, the casing enclosing the cylinders including a wall extending under said ports, and means connecting some of said ports and said wall whereby the casing is supported by said ports, substantially as and for the purpose specified.

14. In an air cooled internal combustion engine, the combination of a plurality of cylinders having laterally extending inlet and exhaust ports, a casing enclosing the cylinders and supported on said ports, and the casing enclosing the cylinders including a wall extending under said ports, and hangers suspended from some of said ports and connected to said wall, substantially as and for the purpose set forth.

In testimony whereof, we have hereunto signed our names at Syracuse, in the county of Onondaga, and State of New York, this 11th day of December, 1919.

LOUIS M. STELLMANN.
RALPH MURPHY.